Patented Mar. 3, 1942

2,275,041

UNITED STATES PATENT OFFICE 2,275,041

MIXED AROMATIC PHOSPHATES AND METHOD FOR PREPARING THE SAME

Edgar C. Britton and Clarence L. Moyle, Midland, Mich., assignors to The Dow Chemical Company, Midland, Mich., a corporation of Michigan No Drawing. Application May 8, 1939, Serial No. 272,446

15 Claims. (Cl. 260—461)

This invention relates to a method for preparing certain aromatic esters of phosphoric acid and also concerns new mixed aromatic phosphates which may be prepared by such method.

Mixed aromatic phosphates are usually prepared by reacting a phenol with a phosphorus oxyhalide to form an aromatic phosphoric acid dihalide and thereafter reacting such intermediate product with one or two different phenols to form the desired mixed aromatic phosphate product. Phenols containing an allyl-type substituent, i. e. a substituent having the general formula

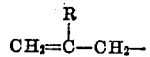

wherein R represents a neutral substituent such as hydrogen, alkyl, halogen, aryl, aralkyl, etc., however, do not react with phosphorus oxyhalides to form phosphates, and accordingly the above-described general method for the preparation of aromatic phosphates cannot be employed in preparing aromatic phosphates in which one or more of the aromatic groups contain an allyl-type substituent.

We have now found that mixed aromatic phosphates in which one or two of the aromatic groups contain allyl-type substituents may be prepared by reaction between the corresponding allyl-type substituted phenols and an aromatic phosphoric acid halide in which at least one aromatic group does not contain any unsaturated substituent. The invention, then, concerns this method as hereinafter described in detail, as well as certain new chemical compounds which may be prepared by the method, i. e. mixed aromatic phosphates having the general formula

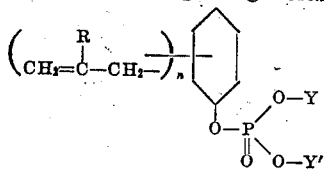

wherein R represents hydrogen, alkyl, or halogen, Y represents an aromatic radical, Y' represents an aromatic radical which does not contain any unsaturated aliphatic substituent, and n represents an integer not greater than 3. The new compounds having this general formula are in most instances stable, high-boiling, odorless oils. They are useful as modifying agents for various synthetic resins, and, because of the reactivity of the allyl-type group, are particularly useful as intermediates in the preparation of a wide variety of new organic chemicals.

As hereinbefore mentioned, our new method for the preparation of mixed allyl-type substituted aromatic phosphates consists in reacting an allyl-type substituted phenol, e. g. allylphenol, 2 - methylallyl - phenol, 2 - chloroallylphenol, di-(2-methylallyl-) phenol, 2-ethylallyl phenol, 2-isobutyl-allyl-phenol, 2-bromoalyl-phenol, 2-phenylallyl-phenol, triallyl-phenol, 2-propylallyl-phenol, etc., with an approximately equivalent amount of an aromatic phosphoric acid halide in which at least one aromatic group does not contain any unsaturated aliphatic substituent. Examples of such aromatic phosphoric acid halides are di-phenyl phosphoric acid monochloride, mono-phenyl phosphoric acid dibromide, phenyl o-tolyl phosphoric acid monobromide, o-allylphenyl p-xenyl phosphoric acid mono-chloride, mono-p-isopropylphenyl phosphoric acid di-chloride, di-p-tertiarybutylphenyl phosphoric acid mono-chloride, mono-o-xenyl phosphoric acid di-bromide, mono-2,4-dichlorophenyl phosphoric acid di-bromide, mono-carvacryl phosphoric acid di-chloride, phenyl o-chlorophenyl phosphoric acid mono-chloride, o-(2-chloroallyl)-phenyl o-tolyl phosphoric acid mono-bromide, etc.

The reaction is usually carried out by heating a mixture of the reactants to a reaction temperature, preferably in the presence of a catalyst such as metallic calcium, magnesium, or aluminum, or a chloride of magnesium, aluminum, or iron, etc. The temperature to which the mixture must be heated in order to obtain rapid and substantially complete reaction is, of course, dependent upon the particular reactants and the relative proportion in which they are employed, the presence or absence of catalyst, reaction media, etc. Since, however, the reaction is accompanied by an evolution of hydrogen halide, it is necessary merely to heat the mixture to a temperature at which hydrogen halide gas evolved. The reaction is preferably carried out at the lowest convenient reaction temperature, since at higher temperatures by-product formation may occur to an objectionable extent. If desired, the reaction may be carried out in the presence of an inert liquid diluent, such as chlorobenzene, carbon tetrachloride, benzene, etc., and in some cases it may be advantageous to employ an agent capable of reacting with the hydrogen halide evolved, for example, pyridine.

In preparing an unsymmetrical mixed aromatic phosphate of the present class, i. e. an allyl-type substituted aromatic phosphate containing three different aromatic radicals, by reaction between two different phenols, one of which contains an allyl-type substituent, and a mono-aryl phosphoric acid di-halide, the intermediate di-aryl phosphoric acid mono-halide product may be separated and purified before carrying out the second reaction. However, it is usually more convenient merely to add the desired quantity of the second phenol directly to the crude di-aryl phosphoric acid mono-halide product and to continue the reaction to form the desired mixed aromatic phosphate. Thus, in preparing o-allylphenyl o-chlorophenyl phenyl phosphate, for example, mono-phenyl phosphoric acid di-chloride is reacted with o-chlorophenol to form crude o-chlorophenyl phenyl phosphoric acid mono-chloride which is then reacted directly and without purification with o-allylphenol to form the desired product.

After the reaction for the formation of the aromatic phosphate is completed, the reaction mixture is preferably treated to remove hydrogen halide therefrom. Such treatment may consist in blowing the hot reaction mixture with air and/or in washing with an aqueous mineral acid, an aqueous alkaline solution, and water. The mixed aromatic phosphate product may then be isolated by usual procedure, e. g. by fractional distillation, or, if the product is a solid at room temperature, by fractional crystallization from a suitable solvent.

The following examples illustrate several ways in which the principle of the invention has been applied but are not to be construed as limiting the same.

*Example 1*

A mixture of 53.7 grams (0.2 mole) of di-phenyl phosphoric acid mono-chloride, 26.8 grams (0.2 mole) of o-allylphenol, and 0.2 gram of magnesium chloride was heated with stirring for 4 hours at temperatures which were gradually raised from 128° to 225° C. During the reaction, hydrogen chloride gas was evolved from the mixture. The crude product was successively washed with dilute aqueous hydrochloric acid, water, and dilute aqueous sodium hydroxide. The washed product was then fractionally distilled under reduced pressure whereby there was obtained 54 grams (73 per cent of the theoretical amount) of di-phenyl mono-o-allylphenyl phosphate, a colorless mobile liquid distilling at 250°–260° C. under 6.5 millimeters pressure, and having a specific gravity of about 1.209 at 25/25° C. and an index of refraction, $n^{25}_D=1.5640$. Di-phenyl mono-o-allylphenyl phosphate has the formula

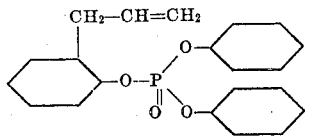

*Example 2*

A mixture of 42.2 grams (0.2 mole) of mono-phenyl phosphoric acid di-chloride, 53.6 grams (0.4 mole) of o-allyl-phenol, and 0.1 gram of magnesium chloride was heated at 120°–226° C. for 2.3 hours, during which time hydrogen chloride was evolved from the mixture. The crude product was then washed with dilute hydrochloric acid, water, and dilute aqueous sodium hydroxide, and the washed product was fractionally distilled under reduced pressure. There was obtained di-o-allylphenyl mono-phenyl phosphate, a colorless mobile liquid distilling at approximately 254°–262° C. under 6 millimeters pressure and having a specific gravity of about 1.177 at 25/25° C. and an index of refraction, $n^{25}_D=1.5669$. This product has the formula

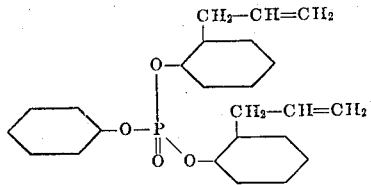

*Example 3*

A mixture of 42.2 grams (0.2 mole) of mono-phenyl phosphoric acid di-chloride and 59.2 grams (0.4 mole) of o-(2-methylallyl)-phenol was dissolved in 100 grams of chloro-benzene, and 36.5 grams (0.45 mole) of pyridine was added gradually over a period of 20 minutes. During the addition of the pyridine the temperature of the mixture rose from 30° C. to 64° C. The mixture was then heated for 1 hour at 64°–140° C. The crude product was washed with water and dilute aqueous sodium hydroxide, and was fractionally distilled under reduced pressure whereby there was obtained di-o-(2-methylallyl)-phenyl mono-phenyl phosphate, a light yellow mobile liquid distilling at approximately 267°–269° C. under 7.5 millimeters pressure and having a specific gravity of about 1.152 at 25/25° C. and an index of refraction $n^{25}_D=1.5647$. It has the formula

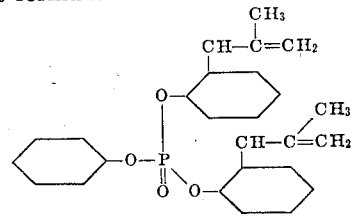

*Example 4*

A mixture of 76.1 grams (0.2 mole) of di-p-tertiary-butylphenyl phosphoric acid mono-chloride, 26.8 grams (0.2 mole) of o-allylphenol, and 0.2 gram of magnesium chloride was heated at 150°–210° C. for 3.5 hours, after which time the reaction mixture was cooled, washed, and fractionally distilled as in Example 1. There was obtained di-p-tertiary-butylphenyl mono-o-allylphenyl phosphate, a pale-yellow mobile liquid distilling at 291°–297° C. under 8 millimeters pressure and having a specific gravity of about 1.100 at 25/25° C. and an index of refraction, $n^{25}_D=1.5421$. This product has the formula

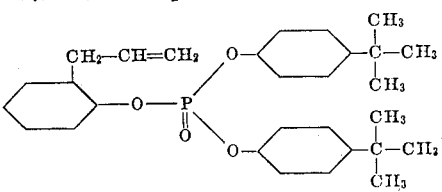

*Example 5*

A mixture of 148.3 grams (0.5 mole) of di-o-tolyl phosphoric acid mono-chloride, 84.3 grams (0.5 mole) of o-(2-chlorcallyl)-phenol and 0.5 gram of magnesium chloride was heated at 150°–188° C. for 5 hours after which time the reaction mixture was cooled, washed, and fractionally distilled as in Example 1. There was obtained di - o - tolyl mono - o - (2-chloroallyl)-phenyl phosphate, a pale-yellow liquid distilling at approximately 258°–267° C. under 7 millimeters pressure and having a specific gravity of about 1.226 at 25/25° C. and an index of refraction, $n^{25}{}_D = 1.5720$. This product has the formula

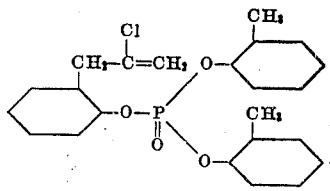

*Example 6*

A mixture of 57.4 grams (0.2 mole) of mono-o-xenyl phosphoric acid di-chloride and 53.6 grams (0.4 mole) of o-allylphenol was dissolved in chlorobenzene and pyridine as in Example 3. The mixture was heated at 46°–135° C. for 1 hour, after which time the crude product was washed and purified by fractional distillation under reduced pressure as in Example 3. There was obtained di-o-allylphenyl mono-o-xenyl phosphate, a colorless liquid distilling at approximately 293°–296° C. under 6 millimeters pressure and having a specific gravity of about 1.188 at 25/25° C., an index of refraction, $n^{25}{}_D = 1.5872$, and the formula

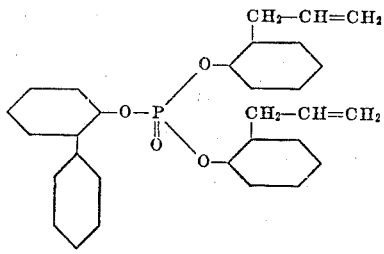

*Example 7*

A mixture of 53.7 grams (0.2 mole) of di-phenyl phosphoric acid mono-chloride, 34.8 grams (0.2 mole) of 2,6-di-allyl-phenol, and 0.5 gram of magnesium chloride was heated at 135°–205° C. for 3 hours, after which time the mixture was cooled, washed, and fractionally distilled as in Example 1. There was obtained di-phenyl mono-(2,6-di-allyl-phenyl) phosphate, a pale-yellow liquid distilling at approximately 254°–258° C. under 5 millimeters pressure and having a specific gravity of about 1.190 at 25/25° C., an index of refraction, $n^{25}{}_D = 1.5637$, and the formula

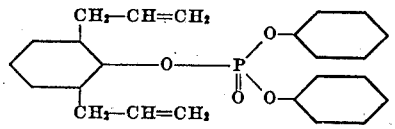

Other new mixed aromatic phosphates of the present class which may be prepared by the method provided by the invention are: di-p-tolyl mono-o-(2-ethylallyl)-phenyl phosphate, o-allylphenyl o-chlorophenyl o-xenyl phosphate, di-m-xenyl mono-o-(2-chloroallyl)-phenyl phosphate, di-2,4-diethylphenyl mono-o-(2-methylallyl)-phenyl phosphate, di-o-allyl phenyl mono-carvacryl phosphate, di-2,4-dibromophenyl mono-o-allylphenyl phosphate, di-phenyl mono-(2,4-di-2-methylallyl-phenyl) phosphate, di-o-(2-chloroallyl)-phenyl mono-p-tertiarybutyl-phenyl phosphate, di-(2,4,6-triallylphenyl) mono-o-chlorophenyl phosphate, di-phenyl mono-o-(2-butylallyl)-phenyl phosphate, phenyl o-tolyl o-allylphenyl phosphate, di-o-tolyl mono-(2-ethyl-4-allylphenyl) phosphate, etc.

In the following claims, the expression "allyl-type substituent" refers to a substituent having the following general structure:

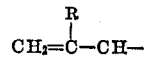

wherein R represents a neutral substituent such as hydrogen, halogen, or an alkyl, aryl, or aralkyl radical.

Other modes of applying the principle of our invention may be employed instead of those explained, change being made as regards the method or materials employed, provided the step or steps stated by any of the following claims be employed, or the product claimed in any of the following claims be obtained.

We therefore particularly point out and distinctly claim as our invention:

1. In a method for preparing mixed aromatic phosphates containing at least one but not more than two phenyl groups substituted by the radical

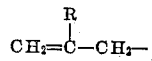

wherein R is a neutral substituent selected from the group consisting of hydrogen, halogen, and the alkyl, aryl, and aralkyl radicals; the step which consists in reacting the correspondingly substituted phenol with an aromatic phosphoric acid halide of the benzene series, at least one aromatic radical of which does not contain an unsaturated aliphatic constituent.

2. In a method for preparing mixed aromatic phosphates having the general formula

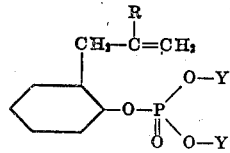

wherein R represents a substituent selected from the group consisting of alkyl radicals, hydrogen, and halogen, Y represents an aromatic radical of the benzene series, Y' represents an aromatic radical of the benzene series containing no unsaturated aliphatic substituent, the step which consists in reacting a phenol selected from the class consisting of o-(2-alkylallyl)-phenols, o-(2-haloallyl)-phenols, and o-allyl-phenol with an aromatic phosphoric acid halide of the benzene series, at least one aromatic radical of which contains no unsaturated aliphatic substituent.

3. In a method for preparing mixed aromatic phosphates having the general formula

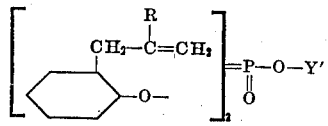

wherein R represents a substituent selected from the group consisting of alkyl radicals, hydrogen, and halogen, and Y' represents an aromatic radical of the benzene series containing no unsaturated aliphatic substituent, the step which consists in reacting a phenol selected from the class consisting of o-(2-alkylallyl)-phenols, o-(2-haloallyl)-phenols, and o-allyl-phenol, with an aromatic phosphoric acid dihalide, the aryl radical of which is a member of the benzene series and contains no unsaturated aliphatic substituent.

4. In a method for preparing mixed aromatic phosphates having the general formula

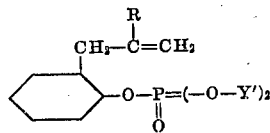

wherein R represents a substituent selected from the group consisting of alkyl radicals, hydrogen, and halogen, and Y' represents an aromatic radical of the benzene series containing no unsaturated aliphatic substituent, the step which consists in reacting a phenol selected from the class consisting of o-(2-alkylallyl)-phenols, o-(2-haloallyl)-phenols, and o-allyl-phenol, with a di-aryl phosphoric acid monohalide, the aryl radicals of which are members of the benzene series and contain no unsaturated aliphatic substituents.

5. A mixed aromatic phosphate having the general formula

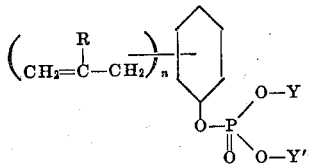

wherein R represents a substituent selected from the class consisting of alkyl radicals, halogen, and hydrogen, Y represents an aromatic radical of the benzene series, Y' represents an aromatic radical of the benzene series having no unsaturated aliphatic substituent, and $n$ represents an integer not greater than 3.

6. A mixed aromatic phosphate selected from the class consisting of phosphates having the general formula

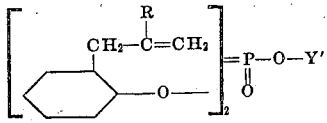

and phosphates having the general formula

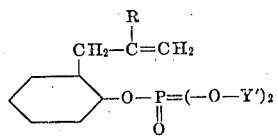

wherein R represents a substituent selected from the class consisting of alkyl radicals, halogen, and hydrogen, and Y' represents an aromatic radical of the benzene series having no unsaturated aliphatic substituent.

7. A mixed aromatic phosphate selected from the class consisting of phosphates having the general formula

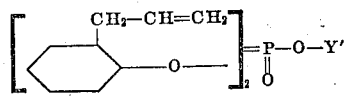

and phosphates having the general formula

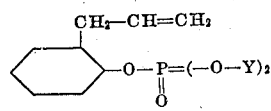

wherein Y' represents an aromatic radical of the benzene series having no unsaturated aliphatic substituent.

8. A mixed triaryl phosphate selected from the class consisting of phosphates having the general formula

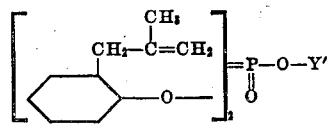

and phosphates having the general formula

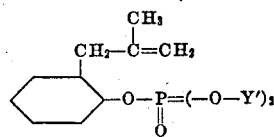

wherein Y' represents an aromatic radical of the benzene series having no unsaturated aliphatic substituent.

9. A mixed triaryl phosphate selected from the class consisting of phosphates having the general formula

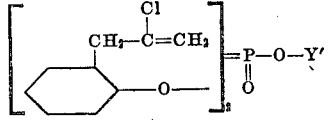

and phosphates having the general formula

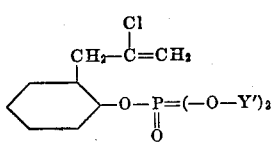

wherein Y' represents an aromatic radical of the benzene series having no unsaturated aliphatic substituent.

10. Di-o-allylphenyl mono-phenyl phosphate, a colorless mobile liquid distilling at approximately 254°–262° C. under 6 millimeters pressure and having a specific gravity of about 1.177 at 25/25° C. and the formula

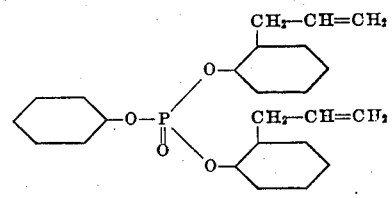

11. Di-o-(2-methylallyl)-phenyl mono-phenyl phosphate, a pale-yellow mobile liquid distilling at approximately 267°–269° C. under 7.5 millimeters pressure and having a specific gravity of about 1.152 at 25/25° C. and the formula

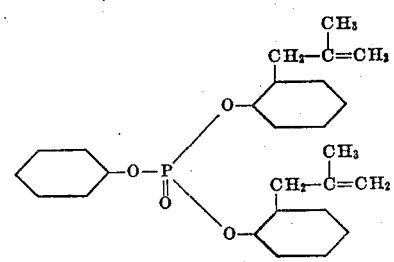

12. Di-o-tolyl mono-o-(2-chloroallyl)-phenyl phosphate, a pale yellow liquid distilling at approximately 258°–267° C. under 7 millimeters pressure and having a specific gravity of about 1.226 at 25/25° C. and the formula

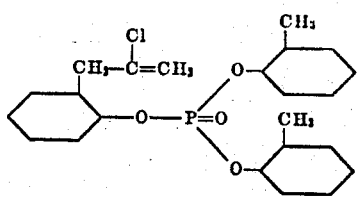

13. In a method for preparing mixed aromatic phosphates having the general formula

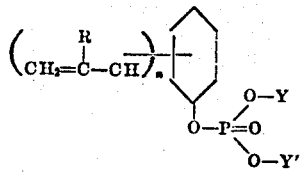

wherein R is a neutral substituent selected from the group consisting of hydrogen, halogen, and the alkyl, aryl, and aralkyl radicals, Y represents an aromatic radical of the benzene series, Y' represents an aromatic radical of the benzene series containing no unsaturated aliphatic substituent, and $n$ represents an integer not greater than 3; the step which consists in reacting a phenol substituted by the radical

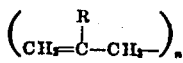

with an aromatic phosphoric acid monohalide, the two aromatic radicals of which are of the benzene series, and at least one of the aromatic radicals contains no unsaturated aliphatic substituent.

14. In a method for preparing mixed aromatic phosphates having the general formula

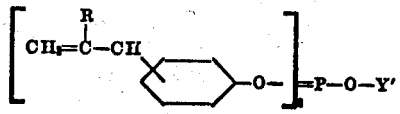

wherein R is a neutral substituent selected from the group consisting of hydrogen, halogen, and the alkyl, aryl, and aralkyl radicals, and Y' represents an aromatic radical of the benzene series containing no unsaturated aliphatic substituent; the step which consists in reacting a phenol substituted by the radical

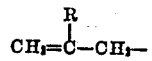

with an aromatic phosphoric acid dihalide, the aromatic radical of which is a member of the benzene series and contains no unsaturated aliphatic substituent.

15. In a method for preparing mixed aromatic phosphates having the general formula

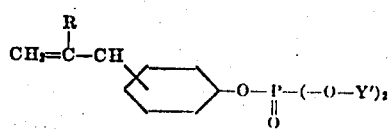

wherein R is a neutral substituent selected from the group consisting of hydrogen, halogen, and the alkyl, aryl, and aralkyl radicals, and Y' represents an aromatic radical of the benzene series containing no unsaturated aliphatic substituent; the step which consists in reacting a phenol substituted by the radical

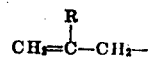

with a diaryl phosphoric acid, monohalide, the aryl radicals of which are members of the benzene series and contain no unsaturated aliphatic substituents.

EDGAR C. BRITTON.
CLARENCE L. MOYLE.